United States Patent [19]

Hasegawa et al.

[11] Patent Number: 4,467,006

[45] Date of Patent: Aug. 21, 1984

[54] WOVEN REINFORCEMENT FOR PLASTIC

[75] Inventors: Shigezi Hasegawa; Tadashige Yamaguchi; Yatsuhiro Hasegawa; Shigekazu Hasegawa, all of Yachiyo, Japan

[73] Assignee: Hasegawa Chemical Industry Co., Ltd., Yachiyo, Japan

[21] Appl. No.: 538,835

[22] Filed: Oct. 4, 1983

Related U.S. Application Data

[63] Continuation of Ser. No. 345,638, Feb. 4, 1982, abandoned.

[30] Foreign Application Priority Data

Feb. 26, 1981 [JP] Japan .................................. 56/27455

[51] Int. Cl.³ ............................................. B32B 7/00
[52] U.S. Cl. ..................................... 428/137; 428/259;
428/262; 428/268; 428/284; 428/288; 428/290;
428/408

[58] Field of Search ............... 428/224, 259, 256, 284, 428/290, 137, 260, 262, 268, 408, 288

[56] References Cited

U.S. PATENT DOCUMENTS 2,836,529  5/1958  Morris ................................. 428/259

Primary Examiner—Marion McCamish
Attorney, Agent, or Firm—Brumbaugh, Graves, Donohue & Raymond

[57] ABSTRACT

A reinforcement for plastics either of cloth-type or of non-woven cloth type comprising metallic reinforcing elements. The presence of the metallic reinforcing elements enables the reinforcement to be easily formed into a desired shape and to maintain the shape into which it is formed. Thus, the present reinforcement is able to eliminate such troublesome processes required for conventional reinforcements as forming and shape maintaining.

2 Claims, 4 Drawing Figures

WOVEN REINFORCEMENT FOR PLASTIC

This application is a continuation of application Ser. No. 345,638, filed on Feb. 4, 1982 now abandoned.

The present invention concerns reinforcements for plastics.

Reinforcements for plastic are used in order to reinforce the strength of resins in producing plastic products such as plastic skis, boats and bathtubs. The reinforcement is molded together with a resin so as to be embedded in the resin. These reinforcements include those of the fibre type wherein glass fibres or carbon fibres are used as they are, the cloth type in which these fibres are woven into a cloth, and the nonwoven cloth type in which these fibres are not woven but are formed into a mat.

Up to the present, the problem in producing plastic products using such reinforcements has been that it was difficult to form them into a predetermined shape so that they are maintained in a fixed shape. In order to increase the strength of plastic product while maintaining their light weight, it is necessary to form the reinforcement into a desired shape, e.g., a U-shape, cylinder-shape, convex shape or wave-shape, before it is molded with resins. Furthermore, in the case of boats and bathtubs, it is also required that the reinforcement should easily formable to the desired contour should retain the shape into which it is formed.

It is the object of the present invention to provide such reinforcements for plastics that can easily be formed into a predetermined shape and can retain the shape into which it is formed.

Embodiments of the present invention will be described with reference to the accompanying drawings.

Figure 1:
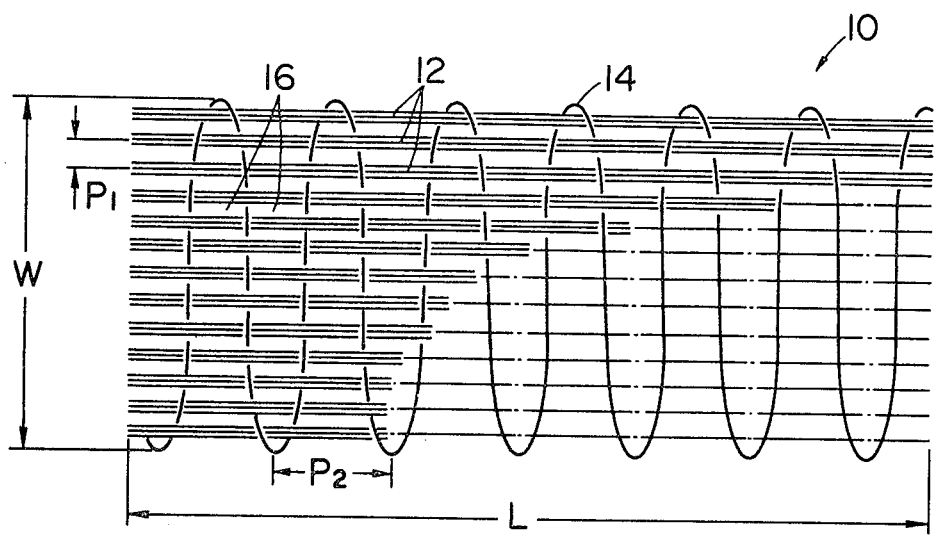
FIG. 1 is a schematic view of a first embodiment of the reinforcement for plastics in accordance with this invention.

FIG. 1 is a schematic view of a cloth type reinforcement 10, which is a first embodiment in accordance with the present invention. This cloth type reinforcement 10 consists of a warp 12 comprising reinforcing fibres such as glass fibres or carbon fibres etc., and a weft 14 comprising fine metallic threads of stainless steel, steel, brass or copper. By using as the weft 14 metallic threads which exhibit high plasticity as well as the property of maintaining the shape into which they have been once formed, the reinforcement 10 can easily be shaped as desired before it is molded with resins. However, the Young's modulus of a metallic thread is smaller than that of a glass fibre or carbon fibre. Therefore, when only metallic threads are used as the weft 14, the final molded resin products, e.g., plastic skis, boats, bathtubs, etc., may lack rigidity and be insufficient in twist-resistance. Also, since the coefficient of linear expansion of a metallic thread is higher than that of a glass fibre or carbon fibre, some dimensional error along the weft may occur during the heating process. In order to overcome the above-mentioned defects, it is possible to use a combined weft which consists not only of metallic threads but also of some glass fibre threads or carbon fibre threads as well. It is also possible to use as the weft, metallic threads and either glass fibre threads or carbon fibre threads alternately or at desired pitches.

The width W and length L of the reinforcement 10 can be determined in accordance with the final products that are to be molded. The pitches $P_1$ of the warp 12 and $P_2$ of the weft 14 can also be determined according to specific uses. By setting $P_1$ and $P_2$ relatively large, spacing 16 can be produced. In case the reinforcement 10 is used with expandable urethane products such as plastic skis, these spacing 16 can serve as openings through which the urethane can easily expand. Thus, the reinforcement 10 is an excellent reinforcement for expandable urethane products.

Figure 2:
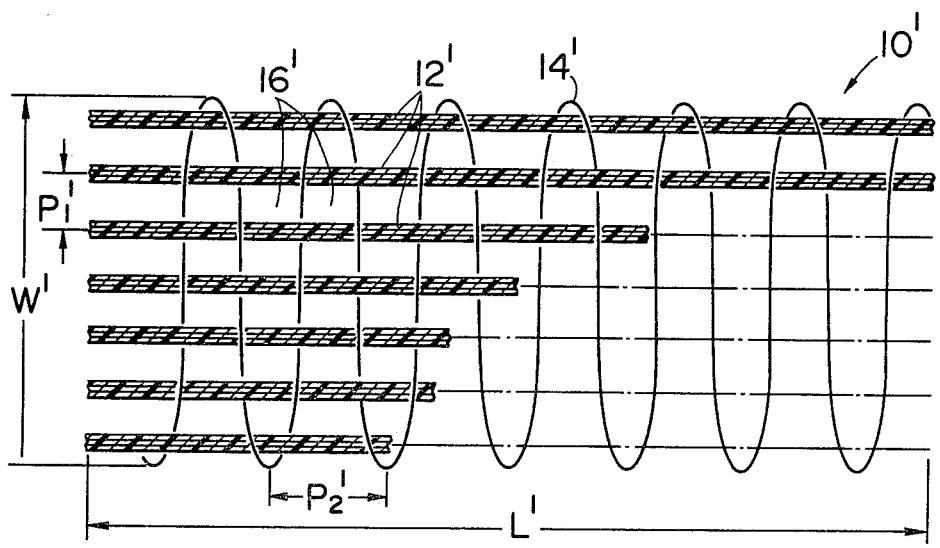
FIG. 2 is a schematic view of a second embodiment of the reinforcement for plastics in accordance with this invention.

FIG. 2 shows a second embodiment of the reinforcement for plastics in accordance with the present invention. The basic structure of the reinforcement 10′ of this embodiment is almost identical to that of the reinforcement 10 shown in FIG. 1. Thereofre, the respective components of the second embodiment are indicated with the same numerals (but with primes) as the corresponding components of the first embodiment.

This embodiment 10′ differs from the reinforcement 10 in FIG. 1 in that the warp 12′ is hardened or semi-hardened by preimpregnated with either a thermosetting resin such as epoxy, polyester, phenol or melamine or with a thermoplastic resin such as A.B.S., polyethylene or polypropylen. Thus, because the warp 12′ is hardened or semi-hardened through impregnation with resins to a greater degree than the reinforcement 10, the reinforcement 10′ has the advantages of easier handling as well as a further increasement in the strength of the final products. As in the first embodiment in FIG. 1; the weft 14′ may consist not only of metallic threads but also of glass fibre threads or the like and these two kinds of threads may be woven alternately or at desired pitches.

In the embodiments shown in FIGS. 1 and 2, metallic threads are used only in the weft. However, depending on the intended use, it is possible also to use metallic threads in the warp at a proper ratio.

Figure 3:
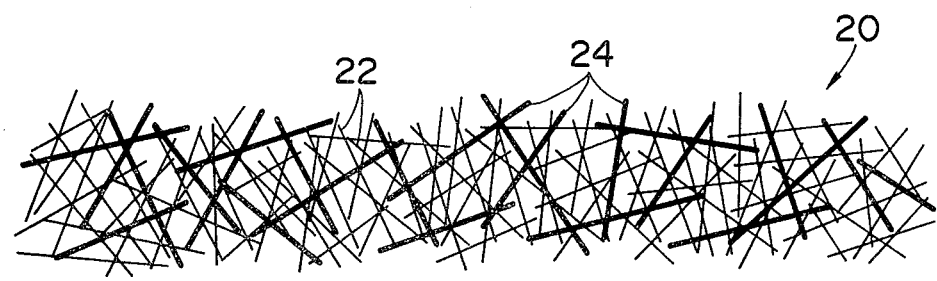
FIG. 3 is a schematic view of a third embodiment of the reinforcement for plastics in accordance with this invention.

FIG. 3 shows a cross section of a third embodiment of the reinforcement for plastics in accordance with the present invention. Unlike the embodiments shown in FIGS. 1 and 2, this embodiment is characterized in that it is made of non-woven cloth.

The reinforcement 20 of this embodiment is a non-woven cloth consisting of short reinforcing fibres 22 such as glass fibres or carbon fibres or the like among which short metallic threads 24 are arranged randomly. The density of the reinforcing fibres 22 of glass fibres or the like and that of the metallic threads 24 can be varied according to intended use. Like the reinforcements of embodiments shown in FIGS. 1 and 2, the reinforcement 20 of this embodiment can be shaped as desired and will retain the shape into which it is formed because of the metallic threads.

Figure 4:
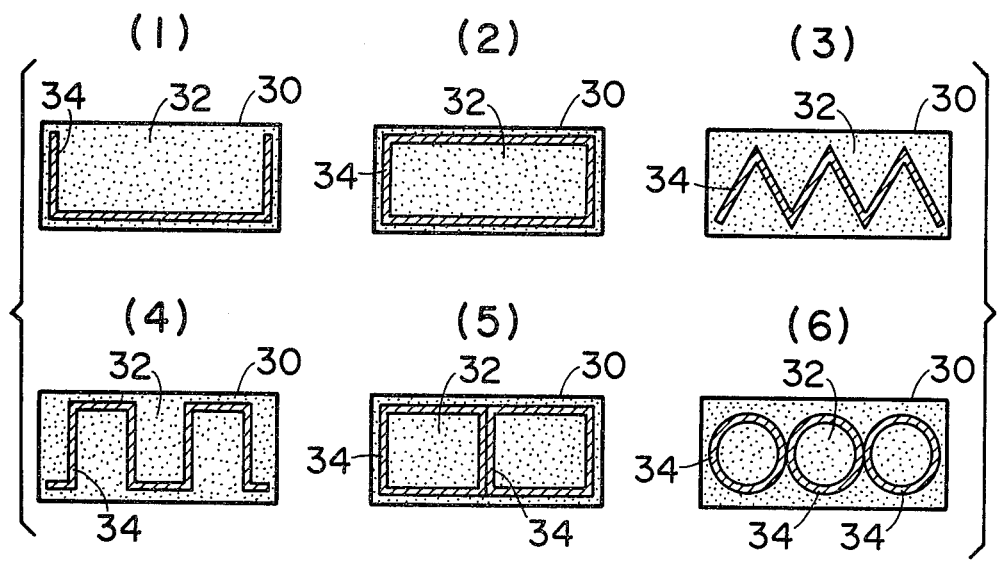
FIGS. 4 (1)–(6) are schematic views of reinforcements for plastics in accordance with this invention as used to reinforce plastic skis.

FIGS. 4(1)–(6) are schematic cross-sectional views of plastic skis of expandable urethane resin in which the reinforcement in accordance with the present invention as shown in FIGS. 1–3 are formed into various shapes and used as reinforcements for plastic skis. The structure of metal molds 30 in each of (1)–(6) of FIG. 4 are shown simplified form. In actually, the metal molds 30 are divided into a metal mold proper and a mold compressing plate. The metal mold itself contains necessary parts such as an edge and gliding side plate and is sealed from above by a top plate (not shown) and a compressing plate. By expanding the expandable urethane 32 within the metal mold, the gliding plate, top plate and edge are all molded into one body. Since expandable urethane is not strong, up to the present, various methods have been applied to add reinforcements to expandable urethane in molding it as one body.

Plastic skis made of expandable urethane are characterized by their light weight. Therefore, the reinforcement to be added should be as light as possible to minimize the total weight of the skis. Therefore, the reinforcement 34 should be molded into one body with the expandable urethane, while, at the same time, maintaining its original shape in such a way that it provides an excellentt reinforcement effect.

As reinforcements 34 for plastic skis, various shapes have been devised as shown in (1)-(6) of FIG. 4. In case of a conventional reinforcement in which metallic threads are not used, it is extremely difficult to mold the ski while retaining the original shape of the reinforcement as shown. This is because: (1) since conventional reinforcements consists entirely of either glass fibres or carbon fibres, they soon lose their shape after being formed into the desired shape before being put in the metal mold, (2) it is impossible to put a support in the metal mold in order to prevent the reinforcement from losing its shape. Up to the present, in order to prevent a reinforcement from losing their shape, the reinforcement was either preimpregnated with resin and then hardened with heat, or was stuck with an adhesive at several points. However, these methods have disadvantages: the former increases the production cost of skis because it requires heat-hardening processes in order to form the reinforcement into the desired shape, while the latter does not effectively prevent the reinforcement from losing its shape in spite of the troublesome sticking work.

The reinforcement in accordance with the present invention overcomes all these defects of the conventional reinforcements. Namely, the reinforcement in accordance with the present invention contains easily formable metallic threads which eliminate the heating and molding processes required to form the reinforcement into a desired shape. Also, the desired shape is maintained without sticking the reinforcement with an adhesive.

Although FIG. 4 shows the reinforcement in accordance with the present invention as used to reinforced plastic skis, the reinforcement in accordance with the present invention can also be used for plastic boats and bathtubs, and in such cases it will greatly increase the efficiency of molding because it can easily be formed to the complicated contoure of these products.

What is claimed is:

1. A woven reinforcement for objects to be formed from plastic materials, the reinforcement comprising warp and weft wherein at least one of the warp and weft of the reinforcement is made from metallic threads, the other of the warp and weft is made from material selected from the group consisting of glass fibers and carbon fibers and the woven reinforcement is impregnated with a thermoplastic or thermosetting resin, the warp and weft being woven together so as to provide openings in the reinforcement through which the plastic of the object to be formed can pass easily, which openings remain open after the thermosetting or thermoplastic resin associated with the glass or carbon fibers has been hardened or semi-hardened.

2. A woven reinforcement for objects to be formed from plastic materials, the reinforcement comprising warp and weft wherein at least one of the warp and weft of the reinforcement is made from a combination of metallic threads and a material selected from the group consisting of glass fibers and carbon fibers, the other of the warp and weft is made from material selected from the group consisting of glass fibers and carbon fibers, the woven reinforcement being impregnated with a thermoplastic or thermosetting resin, the warp and weft being woven together so as to provide openings in the reinforcement through which the plastic can pass easily, which openings remain open after the thermosetting or thermoplastic resin associated with the glass or carbon fibers has been hardened or semi-hardened.

* * * * *